(12) United States Patent
Blom et al.

(10) Patent No.: US 6,906,153 B2
(45) Date of Patent: Jun. 14, 2005

(54) DUAL-SITE OLEFIN POLYMERIZATION CATALYST COMPOSITION

(75) Inventors: Richard Blom, Stathelle (NO); Klaus J. Jens, Stathelle (NO); Arlid Follestad, Stathelle (NO); Olav B. Ryan, Stathelle (NO)

(73) Assignee: Borealis Technology Oy, Porvoo (FI)

( * ) Notice: Subject to any disclaimer, the term of this patent is extended or adjusted under 35 U.S.C. 154(b) by 0 days.

(21) Appl. No.: 10/470,707

(22) PCT Filed: Jan. 31, 2002

(86) PCT No.: PCT/GB02/00426

§ 371 (c)(1),
(2), (4) Date: Aug. 20, 2003

(87) PCT Pub. No.: WO02/060963

PCT Pub. Date: Aug. 8, 2002

(65) Prior Publication Data

US 2004/0068066 A1 Apr. 8, 2004

(30) Foreign Application Priority Data

Jan. 31, 2001 (GB) .............................. 0102440

(51) Int. Cl.⁷ .............................. C08F 4/44; C08F 4/643
(52) U.S. Cl. ........................ 526/113; 526/114; 526/118; 526/119; 526/129; 526/172; 526/210; 502/103; 502/117; 502/120; 502/129; 502/168; 502/152; 502/155; 502/156
(58) Field of Search ............................... 502/103, 117, 502/120, 129, 168, 152, 155, 156; 526/113, 114, 118, 119, 129, 172, 210

(56) References Cited

U.S. PATENT DOCUMENTS 5,043,408 A   8/1991   Kakugo et al.
6,288,192 B1 * 9/2001  Fujita et al. ............. 526/348.6
6,333,423 B1 * 12/2001 Kol et al. ...................... 556/56

FOREIGN PATENT DOCUMENTS

| DE | 91722 | 6/1971 |
|----|-------|--------|
| DE | 91 722 A | 8/1972 |
| DE | 199 00 973 A1 | 7/1999 |
| EP | 0 371 411 A2 | 6/1990 |
| EP | 0 405 446 A2 | 1/1991 |
| EP | 0 405 446 A | 1/1991 |
| EP | 405 446 A2 * | 1/1991 |
| EP | 0 433 943 A | 6/1991 |
| EP | 0 433 943 A2 | 6/1991 |
| EP | 0 675 138 A1 | 7/1994 |
| EP | 0 839 835 A1 | 5/1998 |
| WO | WO 98/37109 | 8/1998 |
| WO | WO 98/46651 | 10/1998 |
| WO | WO 98/57998 | 12/1998 |
| WO | WO 98/58001 | 12/1998 |
| WO | WO 00/50466 | 8/2000 |
| WO | 00/50466 A | 8/2000 |
| WO | WO 01/53361 A1 | 7/2001 |
| WO | WO 02/26837 A2 | 4/2002 |
| WO | 02/26837 A | 4/2002 |

OTHER PUBLICATIONS van der Linden et al, "Polymerizatin of α–Olefins and Butadiene and Catalystic Cyclotrimerization of 1–Alkynes by a New Class of Group IV Catalysts . . . ", J. Am. Chem. Soc. 1995, 117, 3008–3021.

* cited by examiner

*Primary Examiner*—Roberto Rabago
(74) *Attorney, Agent, or Firm*—Nixon & Vanderhye P.C.

(57) ABSTRACT

The invention provides a catalyst system (preferably a heterogeneous catalyst system) comprising: a transition metal bisphenolate catalyst (preferably a group 4 to 6 transition metal bisphenolate catalyst) and another olefin polymerization catalyst, and optionally a co-catalyst, e.g. an organoaluminium compound or a boron compound.

13 Claims, 3 Drawing Sheets

DUAL-SITE OLEFIN POLYMERIZATION CATALYST COMPOSITION

This application is the US national phase of international application PCT/GB02/00426 filed 31 Jan. 2002, which designated the US.

The present invention relates to a polymerization catalyst, in particular a dual-site catalyst, and its use in the production of polymers, in particular olefin homo- and co-polymers, especially polyethylenes.

Complexes of titanium with deprotonated bisphenolic ligands in which the metal is σ-bonded (dative bonded) by the phenolic oxygens of the ligand are known to be effective as catalysts for polymerisation reactions, in particular olefin polymerization reactions. See for example U.S. Pat. No. 5,043,408, EP-A-433943, WO98/37109, EP-A-371411 and WO98/46651.

One example of the protonated precursor of such a ligand is the antioxidant known as Lowinox, Irganox 1081 or 2,2'-S(4-Me-6-tBu-$C_6H_2$OH)$_2$ which is commercially available from Great Lakes and has the formula I:

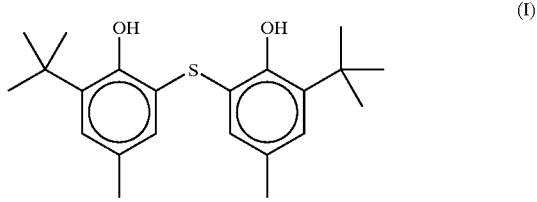

(I)

In the preparation of polymers, and in particular polyolefins, the molecular weight and the molecular weight distribution of the resultant polymer is dependent on a large range of factors, e.g. the nature of the catalyst, the use of chain terminators such as hydrogen, the presence of comonomers, the partial pressures or concentrations of the different monomers, pressure, temperature, reactor residence time, etc. The molecular weight and molecular weight distribution of a polymer strongly affects its processability, e.g. its performance in different moulding or forming techniques and the strength, etc. of moulded or otherwise formed products, and for particular end uses particular molecular weights and molecular weight distributions are accordingly desirable.

Desired molecular weights and molecular weight distributions may be produced by blending two or more polyolefins or alternatively by multistage polymerisation or by polymerisation using two or more different catalytic sites.

Thus it has been known to use so-called dual site catalysts in olefin polymerisation in order to achieve a broad bimodal or multimodal molecular weight distribution in the final polymer product. Such a distribution is desirable as the higher molecular weight component contributes to the strength of the end products made from the polymer while the lower molecular weight component contributes to the processability of the polymer. Such dual site catalysts have typically involved two different catalytic sites, e.g. two different metallocenes or a metallocene and a chromium catalyst, etc.

However with dual site catalysts it is difficult to control the polymer production of the two sites individually. Traditionally hydrogen is used to control molecular weight with increasing hydrogen concentration causing lower molecular weight due to its chain terminating effect. However, with dual site catalysts, hydrogen affects the molecular weight of the product of both sites. Moreover, while chromium oxide (Phillips) sites are relatively unaffected by hydrogen, there is little ability to control the molecular weight of the polymer produced by chromium oxide catalytic sites. Individual control or adjustment of the molecular weights of the polymers produced by the different catalytic sites in a single reactor is therefore not possible.

Moreover when polymerizing ethylene, which is a preferred embodiment of the present invention, with most conventional catalyst systems the molecular weight of the resultant polymer is normally relatively independent of the ethylene pressure used. In contrast, where larger α-olefin monomers (e.g. propylene) are used, in many cases the molecular weight of the resulting polymer is dependent on the monomer concentration used.

Figure 1:
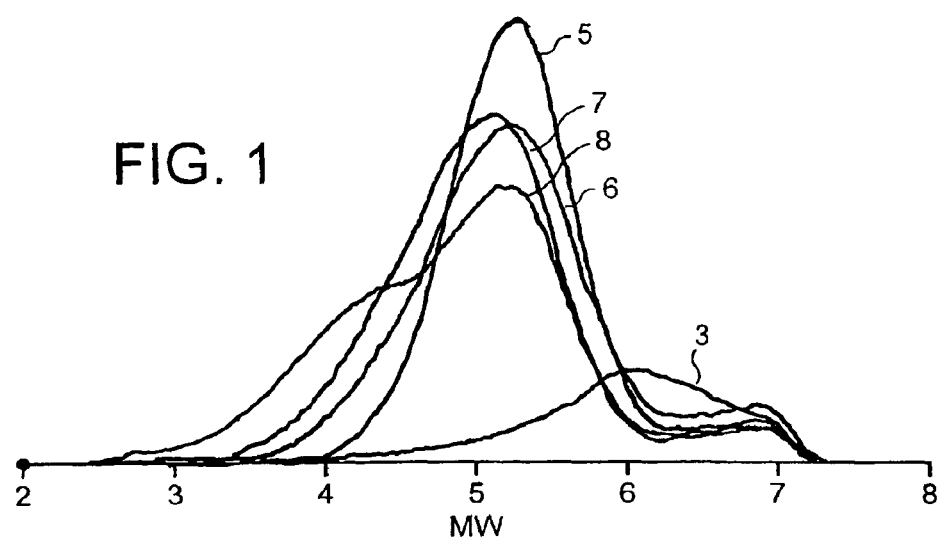
FIG. 1 is a graph showing the higher sensitivity to hydrogen partial pressure of the metallocene catalyst site as compared with the $LTiZ_2$ site.

However we have found that the molecular weight of the polymer produced by a bisphenolic ligand complexed titanium catalytic site is extremely dependent on the pressure of the monomer in contrast to the case with other catalyst systems. Thus we have found that by using a heterogeneous dual site polymerisation catalyst in which one site is provided by a bisphenolate titanium complex and another by another olefin polymerization catalyst, e.g. a metallocene catalyst, a Ziegler Natta catalyst, or a chromium-based (e.g. organo-chromium) catalyst, or by another catalyst (hereinafter a "ethylene monomer pressure insensitive catalyst" or a "hydrogen sensitive catalyst") for which polyolefin molecular weight is relatively independent of the partial pressure or concentration of the primary monomer or for which polyolefin molecular weight is relatively dependent on hydrogen concentration, polyolefins having desirable molecular weight distributions can be produced.

More specifically the use of bisphenolic ligand complexed titanium catalytic sites as a component of a heterogeneous dual site catalyst allows greater flexibility in terms of controlling molecular weight distribution since the molecular weight of the polymer produced by the titanium complex is relatively hydrogen insensitive but yet is significantly increased by increasing monomer pressure. Thus in particular it is possible to control the molecular weight of the different catalyst sites independently by controlling monomer and hydrogen partial pressures.

Moreover we have found that the use of a bisphenolic ligand complexed titanium catalytic site together with a different second catalytic site serves to increase dramatically the compliance of the polymer product as compared with the polymer produced only by the second catalytic site even when the relative proportion (e.g. weight percent) of the polymer produced by the bisphenolic ligand complexed titanium catalytic site is very low. (Compliance is a property related to the elasticity of the polymer. A high compliance for a given shear viscosity indicates a high elongational viscosity and high melt strength at the given shear rate.)

Besides titanium, other transition metals, especially group 4, 5 or 6 metals, in particular other group 4 metals such as zirconium and hafnium may provide bisphenolic-liganded catalytic sites.

Thus viewed from one aspect the invention provides a catalyst system (preferably a heterogeneous catalyst system) comprising: a transition metal bisphenolate catalyst (preferably a group 4 to 6 transition metal bisphenolate catalyst, more preferably a titanium bisphenolate catalyst, especially preferably a titanium IV bisphenolate complex) and another olefin polymerization catalyst (said catalysts preferably being carried by a particulate support material), and optionally a co-catalyst, e.g. an organoaluminium compound (e.g. an alumoxane) or a boron compound.

By "transition metal bisphenolate" herein it is meant that the transition metal is complexed by two phenolate groups, which can be in different non-polymeric ligands or more preferably on the same non-polymeric ligand, i.e. a ligand which in its unbound state comprises two linked phenolic groups. In the complex, such a ligand will be deprotonated, i.e. in its bisphenolate form.

The "another" catalyst used according to the invention may for example be a metallocene, Ziegler Natta, chromium (e.g. organochromium), vanadium or other monomer (generally ethylene) pressure insensitive or hydrogen sensitive olefin polymerization catalyst.

While it has been known that transition metal bisphenolate complexes could be dissolved in hydrocarbons and used as homogeneous catalysts in polyolefin production, such polymerizations yielded a very fine-grained, low bulk density polymer powder. We have now found however that by presenting the bisphenolate complex in heterogeneous form it is possible to produce polyolefins with improved and controllable morphology. The particulate catalyst conveniently comprises a particulate support material, the bisphenolate complex and a co-catalyst (or catalyst activator).

Thus viewed from a further aspect the invention provides a heterogeneous catalyst system comprising particles comprising a transition metal bisphenolate catalyst (preferably a group 4 to 6 transition metal bisphenolate catalyst, more preferably a titanium bisphenolate catalyst, especially preferably a titanium IV bisphenolate complex), and preferably also a co-catalyst.

Viewed from a still further aspect the invention provides a method of producing a polyolefin, characterised in that an alpha olefin is polymerized in the presence of a catalyst system according to the invention.

Viewed from a still further aspect the invention provides a polyolefin article or composition containing detectable traces of a catalyst system of the invention, e.g. detectable titanium traces.

The monomer pressure insensitive or hydrogen sensitive catalyst, if present, may be any material capable of catalysing olefin polymerisation which, in the same polymerization conditions is less sensitive to increase in monomer partial pressure or more sensitive to increase in hydrogen partial pressure than is the bisphenolate complex catalyst in terms of percentage change in weight average molecular weight of the polymer produced.

Preferred bisphenolate complex catalysts according to the invention include complexes for which the protonated precursor of the bisphenolate ligand is a compound of formula II:

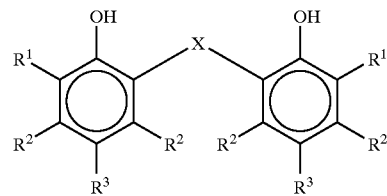

(II)

where X is a bond or a one or two atom bridge, e.g with backbone atoms selected from O, N, S, C, Se and Te, for example an O, S, NR$^4$, C(R$^4$)$_2$ or C(R$^4$)$_2$C(R$^4$)$_2$ bridge (where each R$^4$ is a hydrogen atom or a hydrocarbyl group, e.g. a C$_{1-6}$ hydrocarbyl group);

each R$^1$, which may be the same or different, is a group containing at least 3 non-hydrogen atoms, preferably at least 4 non-hydrogen atoms, for example up to 20 non-hydrogen atoms;

each R$^2$, which may be the same or different, is a hydrogen atom or a group containing at least 1 non-hydrogen atom, e.g. up to 20 non-hydrogen atoms, preferably however each R$^2$ is a hydrogen atom; and each R$^3$, which may be the same or different, is a group containing at least 1 non-hydrogen atom, e.g. up to 20 non-hydrogen atoms; or two or more groups R$^1$, R$^2$ and R$^3$, preferably on the same phenyl ring and more preferably on neighbouring carbons, may together form a bridging group, preferably with 3 to 7 backbone atoms, in particular backbone atoms selected from C, N, O, S and Si.

It is especially preferred that the bridge X in the compound of formula II is S as this seems to coordinate the metal and increase catalytic activity.

In formula II, each of R$^1$, R$^2$ and R$^3$ is preferably a pendant group or hydrogen.

For convenience sake, the bisphenolic ligand precursors of formula II are referred to herein as ligands LH$_2$ (in their protonated form) or L (in their deprotonated form). Their complexes may then be represented for example by formula III LMZ$_n$ (III)

where M is the transition metal; n is a number the value of which is determined by the oxidation state of M and the charge on Z; and each Z, which may be the same or different, is a ligand or a non-coordinating counterion, e.g. a mono- or polydentate ligand, a halogen ion (particularly Cl), a hydrocarbyl group, an amine group (e.g. a group N(R$^4$)$_2$ wherein the two R$^4$ groups may be the same or different and may be as defined above or may together with the intervening nitrogen form a cyclic N-coordinating group, e.g. a C$_4$ to $_6$ azacycloalkane), a siloxy or alkoxy group or a haloboron group (e.g. BF$_4$).

In the ligand precursors of formula II, the groups R$^1$ are preferably hydrocarbyl, hydrocarbylsilyl, hydrocarbylsiloxy, hydrocarbyloxy, or organo-group 14 metal groups, e.g. alkyl, alkenyl, aralkyl, aryl, alkylsilyl, alkylsiloxy, alkoxy, aryloxy, alkyl-Ge or alkyl-Sn groups. Particularly preferred are alkyl and aralkyl groups, especially t-butyl and (C$_6$H$_5$)$_3$C groups. Especially preferably the R$^1$ groups are electron donating groups.

The R$^1$ groups are preferably bulky so as to hinder formation of M L$_2$ complexes.

The R$^3$ groups do not need to be bulky and thus groups such as CH$_3$ are acceptable, however the R$^3$ groups may be any of the groups described above for R$^1$. Where R$^1$ is particularly bulky, e.g. having about 10 non-hydrogen atoms, the $R^3$ groups are also preferably bulky, e.g. containing 4 or more non-hydrogen atoms (for example t-butyl groups).

The groups $R^2$ may be hydrogen atoms or any of the groups described for $R^1$ and $R^3$. Preferably such groups are relatively non-bulky, e.g. being hydrogen atoms or containing up to 6 non-hydrogen atoms.

Hydrocarbyl groups in the $LH_2$ ligand precursors or $LMZ_n$ complexes, unless otherwise stated, preferably contain 1 to 6 carbons in any linear or branched moiety and 5 to 7 ring carbons in any cyclic moiety.

Ligand precursors $LH_2$ as used in the invention are commercially available, are producible from bisphenols or are producible by conjugating together 2,4-substituted-6-unsubstituted-3,5-optionally substituted-phenols using bifunctional coupling agents.

The transition metal complexes of the ligand precursors $LH_2$ may conveniently be produced by reaction of the ligand precursors with suitable transition metal compounds or complexes or by transmetallation of a complex of a different metal with the ligand, or by oxidation/reduction of a complexed metal to bring it into the desired oxidation state. Thus for example for titanium the complexes may be produced by reaction of the ligand precursor with a titanium compound such as $TiCl_4$ in a non-aqueous solvent, or by reaction of $LTiCl_2$ compounds with ligands or counterions Z which serve to displace chloride ligands.

The metal bisphenolate complex catalyst is conveniently used together with a co-catalyst, e.g. an aluminum or boron compound, for example an alumoxane or a fluoroborate. $C_{1-10}$ alkyl group containing alumoxanes, e.g. methyl alumoxane (MAO) and butyl alumoxanes (e.g. hexaisobutylalumoxane and tetraisobutylalumoxane (HIBAO and TIBAO)) are preferred for use according to the present invention.

Alumoxanes are compounds with alternating aluminium and oxygen atoms, generally compounds of formula A or B

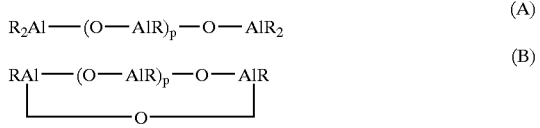

where each R, which may be the same or different, is a $C_{1-10}$ alkyl group, and p is an integer having a value between 0 and 40). In the case of methylalumoxane (MAO), the chemical structure is somewhat more complicated and is thought to have a cage like form. These compounds may be prepared by reaction of an aluminium alkyl with water. The production and use of alumoxanes is described in the patent literature, especially the patent applications of Texas Alkyls, Albemarle, Ethyl, Phillips, Akzo Nobel, Exxon, Idemitsu Kosan, Witco, BASF and Mitsui.

Since MAO often contains trimethylaluminium (TMA) traces and since this may reduce Ti (IV) to the Ti (III) state, the co-catalysts used in the present invention are preferably ones which will not reduce Ti (IV) to Ti(III), e.g. TMA-free MAO, zirconium alkyls, tin-alkyls, boron-alkyls, BOMAG (i.e. $C_4/C_8$ magnesium alkyls), etc. Generally group 1 (e.g. Li), group 2 (e.g. Mg), group 12 (e.g. Zn), group 13 (e.g. B or Ga) or group 14 (e.g. Sn), alkyls are preferred in this respect.

Such co-catalysts may be used separately; however it is preferred that they also be loaded onto a particulate support material, either simultaneously with the metal bisphenolate complex and/or the further catalyst (e.g. a metallocene or organochromium catalyst) or in a separate impregnation step. If loaded simultaneously, the impregnation may be with a reaction product of the co-catalyst and the metal bisphenolate complex or other catalyst.

The term catalyst is used herein to cover materials which are catalytically active as such and also materials (procatalysts) which are activated to a catalytically active form.

Examples of the other catalysts that may be impregnated onto the support include metallocenes, Ziegler Natta, chromium and vanadium catalysts. In this context, the term metallocene is used to indicate a catalyst complex in which a metal (generally a transition metal, lanthanide or actinide, preferably a group 4 to 6 transition metal, especially Ti, Zr or Hf) is η-bonded by one or more, generally 1, 2 or 3, ligand moieties. The η-ligand may be an open chain or a closed ring and may typically have 4 or 5 ring or chain atoms involved in the η-bonding. The η-ligand moiety may have further rings pendant from or fused to it (e.g. it may form part of a fluorenyl or indenyl ring system) and it may be linked via a bridging group to a further ligand group capable of σ-bonding or η-bonding the metal (e.g. it may be a bis-indenyl or bis-cyclopentendienyl group or a "scorpionate" σ/η ligand). Examples of suitable metallocenes may be found in the patent literature, e.g. in particular that deriving from Exxon, Hoechst, Phillips, Dow, Chisso, Mitsui, Fina, BASF, Mitsubishi, Mobil, Targor, DSM and Borealis, e.g. WO96/23010, WO98/49208, WO99/12981, WO99/19335, WO97/28170, EP-A-423101 and EP-A-537130 as well as "Metallocenes", Vol 1, Togni and Halterman (Eds.), Wiley-VCH, 1998, and Brintzinger et al. Angew Chem. Int. Ed. Engl. 34:1143–1170 (1985).

Particularly preferred metallocenes for use in accordance with the invention include zirconocenes, titanocenes and hafnocenes in which the η-ligand is optionally substituted cyclopentadienyl, optionally substituted indenyl, optionally substituted tetrahydroindenyl, and optionally substituted fluorenyl, where the optional substituent may for example be a bridging group linked to a further metal-binding group (e.g. a group which σ- or η-bonds the metal), a hydrocarbyl group, a hydrocarbylsiloxy group, etc. Examples of such metallocenes include:
ethylene-bis-indenyl zirconium dichloride,
bis(n-butyl-cyclopentadienyl) zirconium dichloride,
bis(n-butyl-cyclopentadienyl) zirconium diethylamide chloride,
bis(n-butyl-cyclopentadienyl) hafnium dichloride,
dimethylsilylene-bis-tetrahydroindenyl zirconium dichloride,
dimethylsilylene-bis(2-methyl-4-tButyl-cyclopentadienyl) zirconium dichloride,
$Ph_2C$(fluorenyl)(cyclopentadienyl) zirconium dichloride,
bis indenyl zirconium dichloride,
dimethylsilylene bis indenyl zirconium dichloride,
bis cyclopentadienyl titanium dimethyl,
ethylene bis tetrahydroindenyl titanium dichloride,
ethylene bis (3-methyl-1-indenyl) zirconium dichloride, and
dimethylsilylene bis (3-methyl-1-indenyl) zirconium dichloride.

As with the metal bisphenolate complex catalyst, metallocenes may be used in combination with a co-catalyst or catalyst activator, e.g. an alumoxane or boron compound as described above, especially MAO or a butylalumoxane (e.g. TIBAO or HIBAO).

Examples of Ziegler Natta catalysts which can be used in the catalyst system of the invention include the titanium tetrachloride/magnesium dialkoxide/ethylaluminium dichloride/silica catalyst of Example 2 of WO 95/35323. Examples of chromium and vanadium catalysts which can be used include chromocene derived catalysts (e.g. chromocene:silica reaction products), vanadium chlorides, chromium oxides (e.g. Phillips catalysts) and chromium alkyls.

The catalyst system of the invention may be used in prepolymerized form. Since the ligand precursor $LH_2$ is an antioxidant, such prepolymerized catalyst systems have enhanced storage stability.

In the catalyst system of the invention, the catalyst is preferably loaded onto a particulate support material. This particulate support material may be catalytically inert or it may itself provide one or more catalytically active sites. In this latter case, the catalyst system may simply comprise the metal bisphenolate complex catalyst impregnated into the catalytically active support.

However, the particulate support material used is preferably an organic or inorganic material, e.g. a polymer (such as for example polyethylene, polypropylene, an ethylene-propylene copolymer, another polyolefin or polystyrene or a combination thereof). Such polymeric supports may be formed by precipitating a polymer or by a prepolymerization, e.g. of monomers used in the polymerization for which the catalyst is intended. Where the support is a polymer however it is not to be construed as being a polymer particle produced in or during the initial phase of a polymerization effected using the bisphenolate complex as a heterogeneous catalyst. Thus the bisphenolate complex must be loaded onto a preformed support particle which then if desired may be subject to a prepolymerization to produce a heterogeneous catalyst according to the invention. Suitable polystyrene supports may be produced by radical induced polymerization of styrene in an aqueous medium. Porous polystyrene particles are available from Dyno Specialty Polymers AS, Lillestrom, Norway. However, one especially preferred class of support comprises metal or pseudo metal oxides such as silica, alumina or zirconia and mixed oxides such as silica-alumina, in particular silica, alumina or silica-alumina. Furthermore, aluminium phosphates may be used.

The support is a porous material so that the catalysts may be loaded into the pores of the support, e.g. using a process analogous to those described in WO94/14856 (Mobil), WO95/12622 (Borealis) and WO96/00243 (Exxon). The particle size is not critical but is preferably in the range 5 to 200 $\mu$m, more preferably 10 to 80 $\mu$m, e.g. 20 to 60 $\mu$m.

Before loading, the particulate support material, if inorganic, is preferably calcined, ie heat treated, preferably under a non-reactive gas (such as nitrogen) with a low moisture content. This treatment is preferably at a temperature in excess of 100° C., more preferably 200° C. or higher, e.g. 200–800° C., particularly about 300° C. The calcination treatment is preferably effected for several hours, e.g. 2 to 30 hours, more preferably about 10 hours.

The support may also be treated with an alkylating agent before being loaded with the catalysts. Treatment with the alkylating agent may be effected using an alkylating agent in a gas or liquid phase, e.g. in an organic solvent for the alkylating agent. The alkylating agent may be any agent capable of introducing alkyl groups, preferably $C_{1-6}$ alkyl groups and most especially preferably methyl groups. Such agents are well known in the field of synthetic organic chemistry. Preferably the alkylating agent is an organometallic compound, especially an organoaluminium compound (such as trimethylaluminium (TMA), dimethyl aluminium chloride, triethylaluminium) or a compound such as methyl lithium, dimethyl magnesium, triethylboron, etc.

The quantity of alkylating agent used will depend upon the number of active sites on the surface of the carrier. Thus for example, for a silica support, surface hydroxyls are capable of reacting with the alkylating agent. In general, an excess of alkylating agent is preferably used with any unreacted alkylating agent subsequently being washed away.

Where an organoaluminium alkylating agent is used, this is preferably used in a quantity sufficient to provide a loading of at least 0.1 mmol Al/g carrier, especially at least 0.5 mmol Al/g, more especially at least 0.7 mmol Al/g, more preferably at least 1.4 mmol Al/g carrier, and still more preferably 2 to 3 mmol Al/g carrier.

Following treatment of the support material with the alkylating agent, the support may be removed from the treatment fluid to allow any excess treatment fluid to drain off.

The optionally alkylated support material is loaded with the catalysts, preferably using a solution of the catalyst(s) in an organic solvent therefor, e.g. as described in the patent publications referred to above. Preferably, the volume of catalyst solution used is from 50 to 500% of the pore volume of the carrier, more especially preferably 90 to 300%. The concentration of catalyst compound in the solution used can vary from dilute to saturated depending on the amount of catalytically active sites that it is desired be loaded into the carrier pores.

The active metals (ie. the transition, lanthanide or actinide metals of the catalysts) preferably constitute 0.01 to 4%, more preferably 0.05 to 2%, especially 0.1 to 1% of the total dry weight of the catalyst system in particulate form. Thus these metals may for example be loaded onto the support material at from 0.1 to 4%, preferably 0.5 to 3.0%, especially 1.0 to 2.0%, by weight metal relative to the dry weight of the support material.

After loading of the catalysts onto the support material, the loaded support may be recovered for use in olefin polymerization, e.g. by separation of any excess catalyst solution or solvent and if desired drying of the loaded support, optionally at elevated temperatures, e.g. 25 to 100° C., preferably 30 to 80° C.

As mentioned above, a cocatalyst, e.g. an alumoxane or an ionic catalyst activator (such as a boron or aluminium compound, especially a fluoroborate) may also be mixed with or loaded onto the catalyst support material. Desirably a material is used which acts as a cocatalyst for both the catalysts. This mixing may be done subsequently or more preferably simultaneously to loading of the catalysts, for example by including the cocatalyst in the solution of one or more preferably both of the catalysts or, by contacting the catalyst loaded support material with a solution of the cocatalyst or catalyst activator, e.g. a solution in an organic solvent. Alternatively, however any such further material may be added to the particulate catalyst system, e.g. a catalyst loaded support material, in the polymerization reactor or shortly before dosing of the catalyst material into the reactor.

However, an alternative to using an alumoxane is to use a fluoroborate catalyst activator, especially a $B(C_6F_5)_3$ or more especially a $B(C_6F_5)^-_4$ compound, such as $C_6H_5N(CH_3)_2H:B(C_6F_5)_4$ or $(C_6H_5)_3C:B(C_6F_5)_4$. Other borates of i.e. like this general formula $(\text{cation}^+)_a (\text{borate}^-)_b$ where a and b are positive numbers, may also be used.

Where such a cocatalyst or catalyst activator is used, it is preferably used in a mole ratio to the catalytically active metal of from 0.1:1 to 10000:1, especially 1:1 to 50:1, particularly 1:2 to 30:1. More particularly, where an alumoxane cocatalyst is used, then the aluminium:catalyst metal (M) molar ratio is conveniently 2:1 to 10000:1, preferably 50:1 to 400:1. Where a borane cocatalyst (catalyst activator) is used, the B:M molar ratio is conveniently 2:1 to 1:2, preferably 9:10 to 10:9, especially 1:1. When a neutral triarylboron type cocatalyst is used the B:M molar ratio is typically 1:2 to 500:1, however some aluminium alkyl would normally also be used. When using ionic tetraaryl borate compounds, it is preferred to use carbonium rather than ammonium counterions or to use B:M molar ratio 1:1 or below.

Where the further material is loaded onto the particulate catalyst system, e.g. the catalyst loaded support material, the particulate may be recovered and if desired dried before use in olefin polymerization.

The olefin polymerized in the method of the invention is preferably ethylene or an alpha-olefin or a mixture of ethylene and an α-olefin or a mixture of alpha olefins, for example $C_{2-20}$ olefins, e.g. ethylene, propene, n-but-1-ene, n-hex-1-ene, 4-methyl-pent-1-ene, n-oct-1-ene- etc. Ethylene copolymers, and more especially ethylene homopolymers are especially preferred. The olefins polymerized in the method of the invention may include any compound which includes unsaturated polymerizable groups. Thus for example unsaturated compounds, such as $C_{6-20}$ olefins (including cyclic and polycyclic olefins (e.g. norbornene)), and polyenes, especially $C_{6-20}$ dienes, may be included in a comonomer mixture with lower olefins, e.g. $C_{2-5}$ α-olefins.

In general, where the polymer being produced is a homopolymer it will preferably be polyethylene or polypropylene, most preferably polyethylene. Where the polymer being produced is a copolymer it will likewise preferably be an ethylene or propylene copolymer with ethylene or propylene making up the major proportion (by number and more preferably by weight) of the monomer residues. Comonomers, such as $C_{4-6}$ alkenes, will generally be incorporated to modify the polymer properties, e.g. to improve optical properties, to improve selected mechanical strength properties, to reduce melting point, or to reduce stiffness.

Using the catalysts of the invention, the nature of the monomer/monomer mixture and the polymerization conditions may be changed during the polymerization process so as to produce a desired molecular weight distribution, e.g. a broad bimodal or multimodal molecular weight distribution (MWD) in the final polymer product. In such a broad MWD product, the higher molecular weight component contributes to the strength of the end product while the lower molecular weight component contributes to the processability of the product, e.g. enabling the product to be used in extrusion and blow moulding processes, for example for the preparation of tubes, pipes, containers, etc.

MWD control in the method of the invention may be achieved by controlling the monomer (e.g. ethylene) partial pressure and preferably also hydrogen partial pressure.

Typically the ratio between hydrogen partial pressure and total pressure will be below 0.3. To achieve MWD control by varying monomer concentration the polymerization reaction may be affected at atmospheric or subatmospheric monomer pressure to achieve low molecular weight polymer production by the titanium catalyst and at pressures in the range of atmospheres (e.g. 10 to 50 bar, preferably 20 to 45 bar) to achieve production of very high molecular weight polymers by the bisphenolate metal complex catalyst.

The dual site polymerization catalysts of the invention are preferably used in olefin polymerization processes where molecular weight is controlled by adjusting both monomer concentration and hydrogen feed, e.g. using feedback control based on analysis of the product in or taken from the reactor.

Polymerization in the method of the invention may be effected in one or more, e.g. 1, 2 or 3, polymerization reactors, using conventional polymerization techniques, e.g. gas phase, solution phase, slurry or bulk polymerization, most preferably gas phase polymerization.

In general, a combination of slurry (or bulk) and at least one gas phase reactor is often preferred, particularly with the reactor order being slurry (or bulk) then one or more gas phase. Preferably at least 20% wt. of the polymer product is produced in the slurry phase and at least 20% wt. in the gas phase.

The combination of two or three polymerization reactors in series is especially preferred, particularly when the catalyst system comprises the metal bisphenolate complex and a further catalyst which is hydrogen sensitive and produces polymers with a narrow molecular weight distribution, e.g. a metallocene. The hydrogen concentration is preferably controlled in at least two of the reactors so that the molecular weight ratio between the polymers produced by the different catalytic sites differs by a factor of at least two. In this way a polymer product can be produced with a molecular weight distribution containing at least three, optionally overlapping, peaks. The lowest molecular weight component is preferably produced in the first of the reactors and the highest molecular weight component is preferably produced by the metal bisphenolate complex catalyst.

In an alternative preferred embodiment, one reactor is used to produce at least 90% wt of the total polymer and two further, hydrogen sensitive (e.g. metallocene) catalysts which produce narrow molecular weight distribution polymer are used. Again a multimodal molecular weight distribution, e.g. with three optionally overlapping peaks, may be produced, preferably with the highest molecular weight peak deriving from the bisphenolate metal complex catalyst.

For slurry reactors, the reaction temperature will generally be in the range 60 to 110° C. (e.g. 85–110° C.), the reactor pressure will generally be in the range 5 to 80 bar (e.g. 50–65 bar), and the residence time will generally be in the range 0.3 to 5 hours (e.g. 0.5 to 2 hours). The diluent used will generally be an aliphatic hydrocarbon having a boiling point in the range −70 to +100° C. In such reactors, polymerization may if desired be effected under supercritical conditions.

For gas phase reactors, the reaction temperature used will generally be in the range 60 to 115° C. (e.g. 70 to 110° C.), the reactor pressure will generally be in the range 10 to 25 bar, and the residence time will generally be 1 to 8 hours. The gas used will commonly be a non-reactive gas such as nitrogen together with monomer (e.g. ethylene).

For solution phase reactors, the reaction temperature used will generally be in the range 130 to 270° C., the reactor pressure will generally be in the range 20 to 400 bar and the residence time will generally be in the range 0.1 to 1 hour. The solvent used will commonly be a hydrocarbon with a boiling point in the range 80–200° C.

Generally the quantity of catalyst used will depend upon the nature of the catalyst, the reactor types and conditions and the properties desired for the polymer product. Conventional catalyst quantities, such as described in the publications referred to herein, may be used.

All publications referred to herein are hereby incorporated by reference.

The invention will now be illustrated further by reference to the following non-limiting Examples.

All solvents were purified according to standard procedures, and all reactions, catalyst preparations and storage were carried out under argon atmosphere either in a glove-box or by using Schlenck lines.

EXAMPLE 1

Preparation of 2,2'-S(4-Me,6-$^t$Bu-C$_6$H$_2$O)$_2$TiCl$_2$

A sample of 2,2'-S(4-Me,6-$^t$Bu-C$_6$H$_2$OH)$_2$ (0.665 g, 1.86 mmol) was dissolved in ether (30 ml) and cooled to −30° C. Then TiCl$_4$ (0.353 g, 0.204 ml, 1.86 mmol) was added slowly by the use of a syringe. This resulted in an immediate dark red solution. The dark red solution was allowed to warm to 20° C. and stirred for 2 h, during which time a dark red powder precipitated. The reaction flask was cooled to −40° C., leading to further crystallisation of dark red solid (yield approx. 0.7 g, 78%). $^1$H NMR (C$_6$D$_6$/THF-d$_8$) δ: 7.10 (dd, Ph, 2H), 1.93 (s, Me, 6H) and 1.45 (s, $^t$Bu, 18H).

EXAMPLE 2

Preparation of Ti(NEt$_2$)$_4$

To a solution of diethylamine (7.31 g, 100 mmol, dried over LiAlH$_4$) in anhydrous toluene (150 ml) was added fresh BuLi (42.75 ml 2.5 M hexane solution, 100 mmol) at −78° C. The resulting white suspension of LiNEt$_2$ in toluene was gradually heated to ambient temperature and stirred overnight. TiCl$_4$(THF)$_2$ (8.35 g, 25 mmol) was added in several portions at −78° C. The dark brown solution was carefully heated to room temperature and stirred for 6 h. Toluene was removed under reduced pressure and the product was distilled at 112° C./0.1 Torr. Yield: 5.0 g (59%) yellow-orange liquid.

EXAMPLE 3

Preparation of 2,2'-S(4-Me-6-tBu-C$_6$H$_2$O)$_2$Ti(NEt$_2$)$_2$

Ti(NEt$_2$)$_4$ (504 μl, 1.39 mmol) was dissolved in THF (30 ml) at −40° C. The orange solution was allowed to warm to ambient temperature before it was cooled to −30° C. The Lowinox ligand, 2,2'-S(4-Me-6-$^t$Bu-C$_6$H$_2$OH)$_2$, (500 mg, 1.39 mmol) was dissolved in THF (20 ml), cooled to −30° C. and slowly transferred to the titanium solution. This resulted in an immediate red solution. The solution was allowed to warm to ambient temperature and stirred for 18 hrs. The solvent was removed under vacuum giving a red-orange solid. The product was recrystallised in cold pentane giving an orange solid. $^1$H NMR (Toluene-d$_8$) δ: 7.43 (broad s, Ph, 2H), 7.10 (broad s, Ph, 2H), 3.90 (q, NCH$_2$CH$_3$, 4H), 3.60 (q, NCH$_2$CH$_3$, 4H), 2.08 (s, Me, 6H), 1.51 (s, $^t$Bu, 18H), 1.23 (t, NCH$_2$CH$_3$, 6H), 1.20 (t, NCH$_2$CH$_3$, 6H).

EXAMPLE 4

Preparation of 2-triphenylmethyl-4-tert-butyl-phenol

To tert-butylphenol (82 g, 550 mmol) at 110° C. was added sodium metal (2 g, 87 mmol) and the mixture was stirred for 1 h until the metal had dissolved yielding a dark brown solution. Triphenylmethyl chloride (20 g, 72 mmol) was then added and the mixture heated at 125° C. for 1 h. Toluene (120 ml) was then added and the mixture heated at reflux for 44 h with stirring from an overhead stirrer. After cooling to room temperature, toluene was removed in vacuo and the black residue dissolved in diethyl ether (200 mL). The ethereal solution was washed with aq. 1 M NaOH (3×50mL) and brine (50 ml) before being dried (MgSO$_4$) and concentrated under reduced pressure to yield a black oil. Purification by chromatography on silica gel (EtOAc-hexane 0%, 2%) yielded a pale orange solid. This material was washed with petroleum ether (40–60) affording the title product as a white solid (6.4 g, 23% yield based on triphenylmethyl chloride); Rf 0.66 (EtOAc-hexane 20%); $^1$H NMR (300 MHz, CDCl$_3$) δ 7.34–7.16 (m, 16H), 7.08 (d, J=2.5 Hz, 1H), 6.77 (d, J=8.0 Hz, 1H), 4.35 (s, 1H), 1.15 (s, 9H). A slightly impure fraction was also obtained as a light-brown solid (3.8 g).

EXAMPLE 5

Preparation of 2,2'-S(4-$^t$Bu-6-CPh$_3$-C$_6$H$_2$OH)$_2$

To a solution of triphenylmethyl-4-tert-butylphenol (4.9 g, 125 mmol) and zinc chloride (0.09 g, catalytic amount) in CHCl$_3$ (10 ml) at 0° C. was added sulphur dichloride (402 μl, 62.5 mmol) in CHCl$_3$ (2 ml) over a period of 25 min yielding a pale orange solution. The mixture was warmed to room temperature and stirred for 17 h. Removal of the solvent under reduced pressure afforded the crude product as yellow foam. Purification by chromatography (×2) on silica gel (CH$_2$Cl$_2$-hexane 0%, 5%, 15%, 20%, 25%, 30%) yielded the desired product as a white solid (0.35 g, 7%) Rf 0.64 (CH$_2$Cl$_2$-hexane 50%); $^1$H NMR (300 MHz, CDCl$_3$) δ 7.32–7.18 (M, 36H), 7.11 (D, J=2.5 Hz, 2H), 5.11 (s, 2H), 1.15 (s, 18H); $^{13}$C NMR (125 MHz, CDCl$_3$), δ 148.0, 145.0, 143.5, 134.5, 131.3, 128.0, 127.7, 126.6, 125.5, 121.5, 64.0, 34.8, 31.8.

EXAMPLE 6

Preparation of 2,2'-S(4-$^t$Bu-6-CPh$_3$-C$_6$H$_2$O)$_2$Ti(NEt$_2$)$_2$

Ti(NEt$_2$)$_4$ (53 μl, 0.147 mmol) was dissolved in THF (4 ml) at −45° C. The orange solution was allowed to warm to ambient temperature before it was cooled to −35° C. 2,2'-S(4-$^t$Bu-6-CPh$_3$-C$_6$H$_2$OH)$_2$ (120 mg, 0.147 mmol) was dissolved in THF (3 mL), cooled to −35° C. and slowly transferred to the titanium solution. The solution was allowed to warm to ambient temperature and stirred for 18 hrs. At approximately 0° C. an orange colour was observed, whilst at the end the colour had changed to red. The solvent was removed under reduced pressure giving a red crystalline product. The product was washed with cold pentane. Yield 80 mg (54%). $^1$H NMR (Toluene-d$_8$) δ: 7.44–6.98 (m, Ph, 34H), 2.95 (m, NCH$_2$CH$_3$, 4H), 2.75 (m, NCH$_2$CH$_3$, 4H), 1.20 (s, $^t$Bu, 18H), 0.55 (t, NCH$_2$CH$_3$, 12H).

EXAMPLE 7 (REFERENCE)

Preparation of Heterogeneous Catalyst 2.00 g silica (EP10 from Crosfield Catalysts, calcined at 600° C.) was added to a Thomas bottle. In a second Thomas bottle 2.4 ml MAO/toluene (30% from Albemarle) and 0.6 ml toluene was mixed. In a third Thomas bottle 24.8 mg (n-Bu-Cp)$_2$ZrCl$_2$ was added. The content of the second Thomas bottle was added to the third Thomas bottle using a syringe, and the MAO and metallocene were allowed to react for 30 minutes under continuous stirring. The resulting solution was then added over 10 minutes to the silica while stirring. The mixture was then allowed to react for another 30 minutes while stirring and shaking the powder. The powder was dried for 3 hrs in an argon flow at 50° C.

EXAMPLE 8 (REFERENCE)

Preparation of Heterogeneous Catalyst 2.0 g Silica (EP10 from Crosfield Catalysts, calcined at 390° C.) was added to a Thomas bottle containing a magnetic stirrer. In a second Thomas bottle 2.24 ml MAO/toluene (30% from Albemarle) was diluted with 2.76 ml toluene. The content of the second Thomas bottle was then added to a third Thomas bottle containing 54.9 mg (0.01 mmol) 2,2'-S-(4-Me-6-t-BuC$_6$H$_2$O)$_2$ TiCl$_2$ and stirred for 10 minutes. The resulting solution was then added to the bottle containing the silica dropwise over 10 minutes using a syringe. After addition the powder was stirred for another 30 minutes before drying was carried out by flowing argon through the Thomas bottle at 50° C. for 2 hrs. A dry, grey-rose, catalyst was obtained (1.72 g).

EXAMPLE 9 (REFERENCE)

Preparation of Heterogeneous Catalyst 2.05 g of a Ziegler catalyst produced as described in Example 2 of WO 95/35323 was added to a Thomas bottle containing a magnetic stirrer. In a second Thomas bottle 4.48 ml MAO/toluene (30% from Albemarle) was diluted with 0.52 ml toluene. The content of the second Thomas bottle was then added to the bottle containing the Ziegler catalyst dropwise by using a syringe. After addition of about 1.5 ml, the catalyst became lumpy, and after 2.0 ml addition a slurry was obtained. After 5.0 ml was added the slurry was stirred for about 10 minutes, then dried by flowing argon through the Thomas bottle. After 3.5 hrs drying, a dry catalyst was obtained (2.03 g). The colour is darker brown than the original Ziegler catalyst.

EXAMPLE 10

Preparation of a Heterogeneous Catalyst Precursor 10.0 ml 20% BOMAG (a commercially available butyl/octyl magnesium substance) in heptane was added to a small Schlenck tube (8.76 mmol Mg). 1.77 ml toluene and a magnetic stirrer was added to the same tube before the solution was cooled to 0° C. in an ice-bath. 15.76 mmol (2.46 ml) 2-Ethyl-hexanol was dropwise added to the solution under continuous stirring over a period of 30 minutes. After addition, the solution was stirred for another 30 minutes while the temperature was slowly increased to ambient temperature. The solution was then transferred to a Thomas bottle and moved into the glovebox. 4.0 g of 1.6 mmol EADC/SiO$_2$ (1.6 mmol Al/g SiO$_2$, produced as described in Example 2 of WO 95/35323) was added to an empty Thomas bottle containing a magnetic stirrer. 10.4 ml of the Mg solution was transferred to a third Thomas bottle and diluted with 7.32 ml toluene. The total volume (17.72 ml) was added to the Thomas bottle containing EADC/SiO$_2$ and the slurry formed was stirred for 3.5 hours. The solvent was then removed in an argon flow at 50° C. for 2.5 hours.

EXAMPLE 11

Preparation of a Heterogeneous Catalyst Precursor 1.0 g of the product of Example 10 was added to a Thomas bottle. 0.15 mmol TiCl$_4$ (16.5 µl) was dissolved in 3.5 ml toluene. The toluene solution was added to the Thomas bottle giving a slurry which was stirred for 4 hours and 10 minutes before solvent was removed by blowing argon through it at 50° C. for 2 hours.

EXAMPLE 12

Preparation of a Heterogeneous Catalyst 1.0 g of the product of Example 10 was added to a Thomas bottle. 0.15 mmol 2,2'-S(4-Me-6-tBu-C$_6$H$_2$O)$_2$TiCl$_2$ (82.4 mg) was dissolved in 3.0 ml toluene and 0.5 ml MAO/toluene (30 wt % from Albemarle). The toluene solution was added to the Thomas bottle giving a slurry. The slurry was stirred for 3 hrs before the solvent was removed by blowing argon through at 50° C. for 2 hours 40 minutes.

EXAMPLE 13

Preparation of a Heterogeneous Catalyst 0.50 ml 30 wt % MAO (Albemarle) was diluted with 0.25 ml toluene in a Thomas bottle. This toluene solution was then added to 0.50 g of the product of Example 12 giving a slurry. The slurry was stirred for 1 hour 15 minutes before the solvent was removed at 50° C. in an argon flow for 2.5 hours.

EXAMPLE 14

Preparation of a Heterogeneous Catalyst 1.0 g of the product of Example 10 was added to a Thomas bottle. 0.15 mmol 2,2'-S(4-Me-6-tBu-C$_6$H$_2$O)$_2$Ti(NEt$_2$)$_2$ (82.4 mg) was dissolved in 3.5 ml toluene. The toluene solution was added to the Thomas bottle giving a slurry. The slurry was stirred for 3 hrs before the solvent was removed by blowing argon through at 50° C. for 2 hrs 40 minutes.

EXAMPLE 15

Preparation of a Heterogenous Catalyst 0.50 ml 30 wt % MAO (Albemarle) was diluted with 0.25 ml toluene in a Thomas bottle. This toluene solution was then added to 0.50 g of the product of Example 14 giving a slurry. The slurry was stirred for 1 hr 15 min before the solvent was removed at 50° C. in an argon flow for 2 hrs 50 min.

EXAMPLE 16

Preparation of a Heterogeneous Dual Site Catalyst 0.404 g of the product of Example 14 was added to 0.61 ml of a toluene solution containing 6.7 µl TiCl$_4$ (0.061 mmol). The mixture was stirred for 3 hrs 15 min, then the solvent was removed at 50° C. under argon purging for 2 hrs 45 min.

EXAMPLE 17

Preparation of a Heterogeneous Dual Site Catalyst 0.450 g of the product of Example 12 was added to 0.68 ml of a toluene solution containing 7.5 µl TiCl$_4$ (0.068 mmol). The mixture was stirred for 3 hrs, then the solvent was removed at 50° C. under argon purging for 2 hrs 30 min.

EXAMPLE 18

Preparation of a Heterogeneous Dual Site Catalyst 2.0 g of a Ziegler catalyst prepared according to Example 2 of WO 95/35323 was added to a Thomas bottle containing a magnetic stirrer. In a second Thomas bottle 2.24 ml MAO/toluene (30% from Albemarle) was diluted with 0.26 ml toluene. The content of the second Thomas bottle was then added to a third Thomas bottle containing 0.1 mmol of 2,2'-S(4-Me-6-tBu-C$_6$H$_2$O)$_2$TiCl$_2$ and stirred for 10 minutes. The catalyst solution was then added to the bottle containing the Ziegler catalyst dropwise over 10 minutes by using a syringe. The catalyst was lumpy. After addition the powder was stirred and shaken for another 30 minutes before drying by flowing argon through the Thomas bottle at 50° C. for 2 hrs. A dry catalyst was obtained (0.65 g).

EXAMPLE 19

Preparation of a Heterogeneous Dual site Catalyst

The same procedure was used as for Example 18, but instead of using 0.1 mmol 2,2'-S(4-Me-6-tBu-C$_6$H$_2$O)$_2$TiCl$_2$, 0.2 mmol was used. A dry catalyst was obtained (2.58 g).

EXAMPLE 20

Preparation of Heterogeneous Dual Site Catalyst 2.0 g silica (55SJ from Grace, calcined at 393° C.) was transferred to a Thomas bottle. In a second Thomas bottle 0.1 mmol of 2,2'-S-(4-Me-6-t-Bu-C$_6$H$_2$O)$_2$TiCl$_2$ was added, and to a third Thomas bottle 6 mg (0.015 mmol)(n-Bu-Cp)$_2$ZrCl$_2$ was added. In a fourth Thomas bottle 2.91 ml MAO/toluene (30% from Albemarle) and 3.59 ml toluene was added. 3.5 ml of the MAO/toluene solution was added to the bottle containing the titanium complex and 3.0 ml of the solution was added to the bottle containing the metallocene. After 10 minutes, 1.5 ml of the metallocene/MAO/toluene solution (containing 0.007 mmol metallocene) was added to the solution containing the titanium complex yielding a toluene solution of both active components. The total content of this solution (5.0 ml) was then dropwise added to the bottle containing the silica over a 10 minutes period. The final catalyst paste was periodically shaken for another half hour before drying was carried out in an argon flow at 50° C. for 2 hrs 30 minutes yielding 2.49 g of a free floating powder. The catalyst contained 0.25 wt % Ti, 0.07 wt % Zr and 13.5 wt % Al on dry support.

EXAMPLE 21

Preparation of Heterogeneous Dual Site Catalyst

The same preparation route was used as described for Example 20, but the amount of toluene used was 5.59 ml instead of 3.59 ml.

EXAMPLE 22

Preparation of Heterogeneous Dual Site Catalyst 2.0 g silica (Sylopol 55SJ, calcined at 408° C.) was transferred to a Thomas bottle. In a second Thomas bottle 0.1 mmol of 2,2'-S(4-Me-6-tBu-C$_6$H$_2$O)$_2$TiCl$_2$ was added, and to a third Thomas bottle 7.3 mg (0.015 ml) (n-Bu-Cp)$_2$HfCl$_2$ was added. In a fourth Thomas bottle 2.91 ml MAO/toluene (30% from Albemarle) and 5.59 ml toluene was added. 5.5 ml of the MAO/toluene solution was added to the bottle containing the titanium complex and 3.0 ml of the solution was added to the bottle containing the metallocene. After 20 minutes, 1.5 ml of the metallocene/MAO/toluene solution (containing 0.007 mmol metallocene) was added to the solution containing the titanium complex yielding a toluene solution of both active components. The total content of this solution (7.0 ml) was then dropwise added to the bottle containing the silica over a 10 minutes period. The final catalyst slurry was stirred for another 2 hours before drying was carried out in an argon flow at 50° C. for 2 hrs yielding 2.57 g of a free flowing powder.

EXAMPLE 23

Preparation of Heterogeneous Dual Site Catalyst 2.0 g silica (Sylopol 55SJ, calcined at 408° C.) was transferred to a Thomas bottle. In a second Thomas bottle 0.05 mmol of 2,2'-S(4-Me-6-tBu-C$_6$H$_2$O)$_2$TiCl$_2$ was added, and to a third Thomas bottle 7.3 mg (0.015 mmol) (nBuCp)$_2$HfCl$_2$ was added. In a fourth Thomas bottle 2.91 ml MAO/toluene (30% from Albemarle) and 5.59 ml toluene was added. 5.5 ml of the MAO/toluene solution was added to the bottle containing the titanium complex and 3.0 ml of the solution was added to the bottle containing the metallocene. After 20 minutes 1.5 ml of the metallocene/MAO/toluene (containing 0.007 mmol metallocene) was added to the solution containing the titanium complex yielding a toluene solution of both active components. The total content of this solution (7.0 ml) was then dropwise added to the bottle containing the silica over a 10 minutes period. The final catalyst slurry was stirred for another 2 hours before drying was carried out in an argon flow at 50° C. for 2 hrs 55 min yielding 2.73 g of a free flowing powder.

EXAMPLE 24

Ethylene Polymerization

Ethylene was polymerised using the heterogeneous catalysts of the preceding Examples in a 1 liter autoclave using 0.5L isobutane as diluent, generally at 38 bar total pressure and 80° C.

The results and further process conditions are set out in Table 1 below.

TABLE 1

| Run | Catalyst (Example No.) | H$_2$ bar/% | Poly. time min | PE yield g | Activity g/g/h | M$_w$ | M$_w$/M$_n$ |
|---|---|---|---|---|---|---|---|
| 1 | 7 | 0 | 30 | 42 | 1120 | 207 000 | 4.1 |
| 2 | 8 | 0 | 60 | 37 | 180 | — | — |
| 3 | 8 | 1 | 61 | 18 | 86 | 1 950000 | — |
| 4 | 8 | 4 | 62 | 23 | 71 | 1 520000 | — |
| 5 | 20 | 0 | 49 | 85 | 1020 | 516 000 | 4.7 |
| 6 | 20 | 0.2%* | 60 | 142 | 1000 | 608 000 | 9.2 |
| 7 | 20 | 0.5%* | 60 | 144 | 1010 | 403 000 | 9.4 |
| 8 | 20 | 1 | 60 | 141 | 1010 | 421 000 | 26 |

*These values are molar concentrations of hydrogen in the ethylene feed. The remaining values are initial batch charges of hydrogen in bar in the reactor.

The polymers have been characterised by GPC analyses. The MWD traces of the dual site polymers are shown in FIG. 1 of the accompanying drawings labelled with the run numbers from Table 1.

Figure 2:
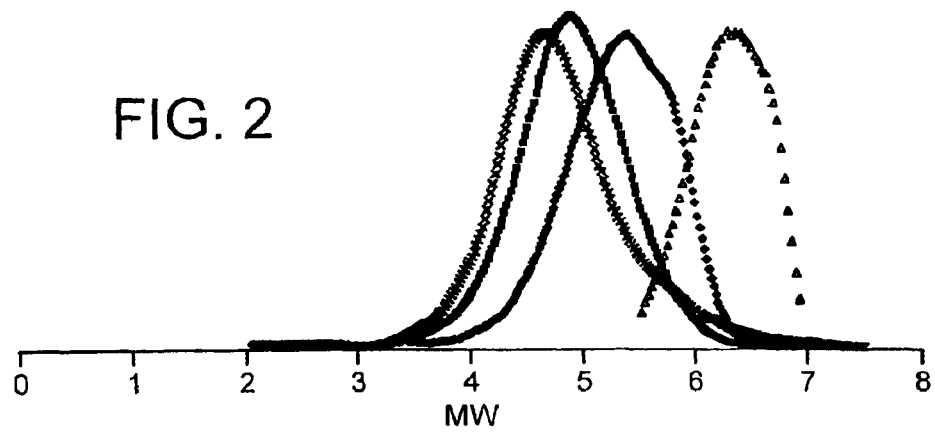
FIG. 2 shows MWD traces of polyethylene produced using separate catalysts.

The MWD traces all show a clear high molecular fraction at extremely high molecular weight. This is consistent with the molecular weight produced by the single site $LTiZ_2$ catalyst of Example 8. The high peak is the metallocene component and upon addition of hydrogen, the metallocene peak is affected and broadened as expected due to the change in partial pressure of hydrogen throughout the polymerisation. The largest broadening is observed for the polymer prepared with 1 bar hydrogen. In this case, the partial pressure of hydrogen decreases during the polymerization period, yielding a large portion of low molecular weight product. FIG. 1 clearly shows the relatively higher sensitivity to hydrogen partial pressure of the metallocene catalyst site as compared with the $LTiZ_2$ site. The relatively higher sensitivity to monomer pressure of the $LTiZ_2$ site as compared with the metallocene site is demonstrated in FIG. 2 of the accompanying drawings which shows the MWD traces of polyethylenes produced under equivalent conditions using $Et(Ind)_2$ $ZrCl_2$ and $2,2'-S(4-Me-6-tBu-C_6H_2O)_2TiCl_2$ catalysts at 1 and 38 bar total pressure. Open triangles Δ and crosses x, the outermost traces, are the titanium catalyst at the high and low pressures respectively, while solid diamonds ♦ and solid squares ■, the inner traces, are for the zirconocene catalyst at the low and high ethylene pressures respectively. In these runs, hydrogen was not added.

The behaviour of the bisphenolate titanium catalytic site is most unexpected. Metallocenes and Phillips catalysts, when used in ethylene polymerization, give almost constant molecular weight when ethylene pressure is changed. For Ziegler catalysts, when used in ethylene polymerization, the molecular weight is determined by the ratio between hydrogen and ethylene pressures, decreasing as the ratio increases. Thus the major ethylene polymerization catalysts in use today show a very different behaviour from the bisphenolate titanium complex.

EXAMPLE 25

One and Two Step Ethylene Polymerisations Using Dual Site Catalysts

Ethylene was polymerised using the heterogeneous catalysts of Examples 21 and 22 in a 1L autoclave using 0.5L isobutane as diluent, at pressures of 30 or 38 bar and temperatures of 80 and 94° C., with or without the addition of hydrogen and with or without the addition of a co-monomer (5 ml of 1-hexene).

The results and further process conditions are set out in Table 2 below.

TABLE 2

| Run | Catalyst Example No. | Step | Temp [° C.] | Ptot [bar] | $H_2$ [%] | 1-hexene [ml] | Time [min] | PE [g] | Activity [g/g/hr] | HLMI g/10 min | $M_w$ | $M_w$/$M_n$ |
|---|---|---|---|---|---|---|---|---|---|---|---|---|
| 1 | 21 | 1 | 80 | 30 | 0.4 | — | 30 | 32.4 | 540.0 | 3.38 | >420 000 | >11.1 |
| 2 | 21 | 1 | 80 | 30 | 0.4 | — | 15 | — | — | — | — | — |
|   |   | 2 | 80 | 30 | — | 5 ml | 105 | 89.7 | 237.3 | 1.70 | >305 000 | >4.7 |
| 3 | 21 | 1 | 80 | 30 | 0.4 | — | 10 | — | — | — | — | — |
|   |   | 2 | 80 | 30 | — | 5 ml | 135 | 76 | 155.7 | 2.01 | >235 000 | >4.4 |
| 4 | 22 | 1 | 80 | 30 | 0.4 | — | 15 | 16.3 | 306.1 | 0.00 | >585 000 | >5.8 |
| 5 | 22 | 1 | 80 | 30 | — | — | 15 | 10.2 | 151.1 | — | >780 000 | >4.1 |
| 6 | 22 | 1 | 80 | 30 | — | 5 ml | 50 | 29.4 | 104.4 | 0.08 | >490 000 | >5.1 |
| 7 | 22 | 1 | 80 | 30 | 0.4 | — | 15 | — | — | — | — | — |
|   |   | 2 | 80 | 30 | — | 5 ml | 91 | 43.7 | 101.1 | 0.02 | >430 000 | >6.5 |
| 8 | 22 | 1 | 80 | 38 | 0.4 | — | 15 | — | — | — | — | — |
|   |   | 2 | 80 | 38 | — | 5 ml | 98 | 78.8 | 163.0 | 0.02 | >625 000 | >13.3 |
| 9 | 22 | 1 | 94 | 38 | 0.4 | — | 30 | — | — | — |   |   |
|   |   | 2 | 94 | 38 | — | — | 80 | 35 | 90.2 | 0.00 | 1200 000 | 92 |
| 10 | 22 | 1 | 94 | 38 | 0.8 | — | 30 | — | — | — |   |   |
|   |   | 2 | 94 | 38 | — | — | 80 | 31.4 | 77.0 | 0.01 | 1130 000 | 45 |
| 11 | 22 | 1 | 94 | 38 | 1.2 | — | 30 | — | — | — |   |   |
|   |   | 2 | 94 | 38 | — | — | 121 | 34.2 | 57.3 | 0.00 | 1340 000 | 45 |

Figure 3:
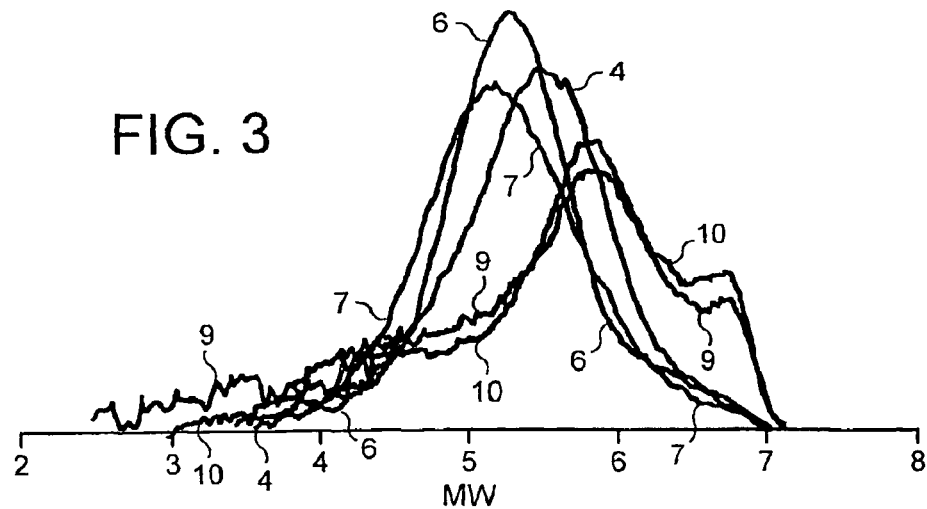
FIG. 3 shows the MWD traces for selected runs.

FIG. 3 of the accompanying drawings shows the MWD traces of runs 4, 6, 7, 9 and 10 which clearly show the effect of the two-step polymerisation (i.e. the hydrogen partial pressure change effect) and the effect of the change in ethylene pressure. The trimodal shape of the trace for run 10 indicates a peak at low molecular weight (log MW about 4.4) corresponding to hafnocene with hydrogen present and a peak at high molecular weight (log MW about 6.8) corresponding to $LTiZ_2$. The intermediate peak probably has contributions from both catalytic sites. Runs 4, 6 and 7 were carried out at lower ethylene pressure where the molecular weight for the $LTiZ_2$peak is reduced and so overlaps with the hafnocene peak. It can thus be seen that using two or more stage polymerisation and the dual site catalysts of the invention, trimodal (or more highly multimodal) polyethylenes may be produced.

EXAMPLE 26

Ethylene Homopolymerisation with Heterogeneous Dual Site Ziegler Natta/titanium Bisphenolate Catalysts Ethylene was polymerised using the catalysts of Examples 11, 13, 14, 16 and 17 in a 1L autoclave containing 0.5L isobutane as a diluent, at a temperature of 94° C., at a total pressure of 30 or 38 bar, with or without hydrogen addition and with or without addition of triethylaluminium (TEAL) (in a 10 vol. % solution in heptane) and/or methylalumoxane (MAO) (in a 6.5 wt. % Al solution from Akzo) as co-catalysts. The results and further process conditions are set out in Table 3 below.

TABLE 3

| Run | Catalyst (Example No.) | Catal [mg] | Ptot [bar] | $H_2$ [bar] | Time [min] | Polymer [g] | Activity [gPE/g Cat/hr] | HLMI g/10 min | Cocatalyst | $M_w$ | $M_n$ | $M_w/M_n$ |
|---|---|---|---|---|---|---|---|---|---|---|---|---|
| 1 | 11 | 124 | 38 | 4 | 30 | 60.5 | 975.8 | 63.90 | 1 ml TEAL | 105 000 | 25 000 | 4.2 |
| 2 | 13 | 158 | 38 | — | 65 | 36.5 | 213.2 | 0.00 | — | 1340 000 | 290000 | 4.6 |
| 3 | 14 | 161 | 38 | 4 | 60 | 27.1 | 168.3 | 0.06 | 2 ml TEAL + 4 ml MAO | 250 000 | 60 000 | 4.2 |
| 4 | 16 | 162 | 30 | 4 | 30 | 20.7 | 255.6 | high | 2 ml TEAL + 2 ml MAO | 60 000 | 7 900 | 7.6 |
| 5 | 16 | 141 | 38 | 4 | 30 | 64.5 | 914.9 | 15.50 | 2 ml TEAL + 2 ml MAO | 190 000 | 30 000 | 6.3 |
| 6 | 17 | 169 | 38 | 4 | 30 | 167 | 1976.3 | 5.83 | 2 ml TEAL + 2 ml MAO | 260 000 | 40 000 | 6.5 |
| 7 | 17 | 144 | 30 | 4 | 35 | 54.7 | 651.2 | 129.00 | 2 ml TEAL + 2 ml MAO | 105 000 | 15 000 | 7.0 |

EXAMPLE 27

Comparison with Commercially Available Polyethylene Blow Moulding Resins

Figure 4:
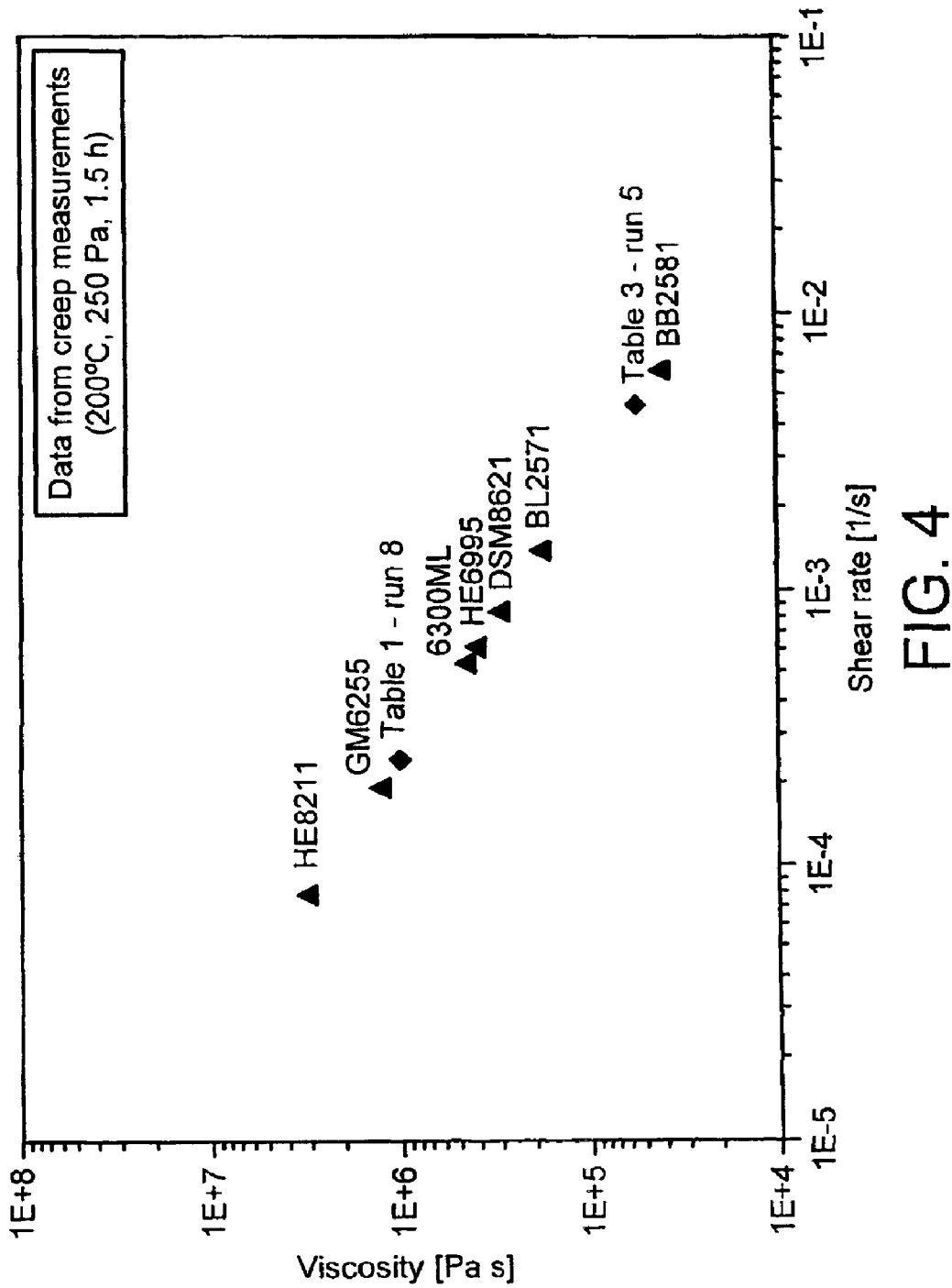
FIG. 4 shows the relationship between shear rate and viscosity of various polyethylenes.

The viscosities at low shear rates for the polyethylenes of Table 1 Run 8 and Table 3 Run 5 and for the commercially available blow moulding polyethylenes HE 8211 (Borealis), GM 6255 (Hoechst), GM 9240 (Hoechst) Hizex 6300 ML (Mitsui), HE 8341 (Borealis), HE 8344 (Borealis), and 8261 (DSM) were determined at 200° C., 250 Pa, 1.5 hours in a steady state creep measurement. As can be seen from FIG. 4 of the accompanying drawings, the polyethylenes according to the invention fall within the span of the commercial materials.

Figure 5:
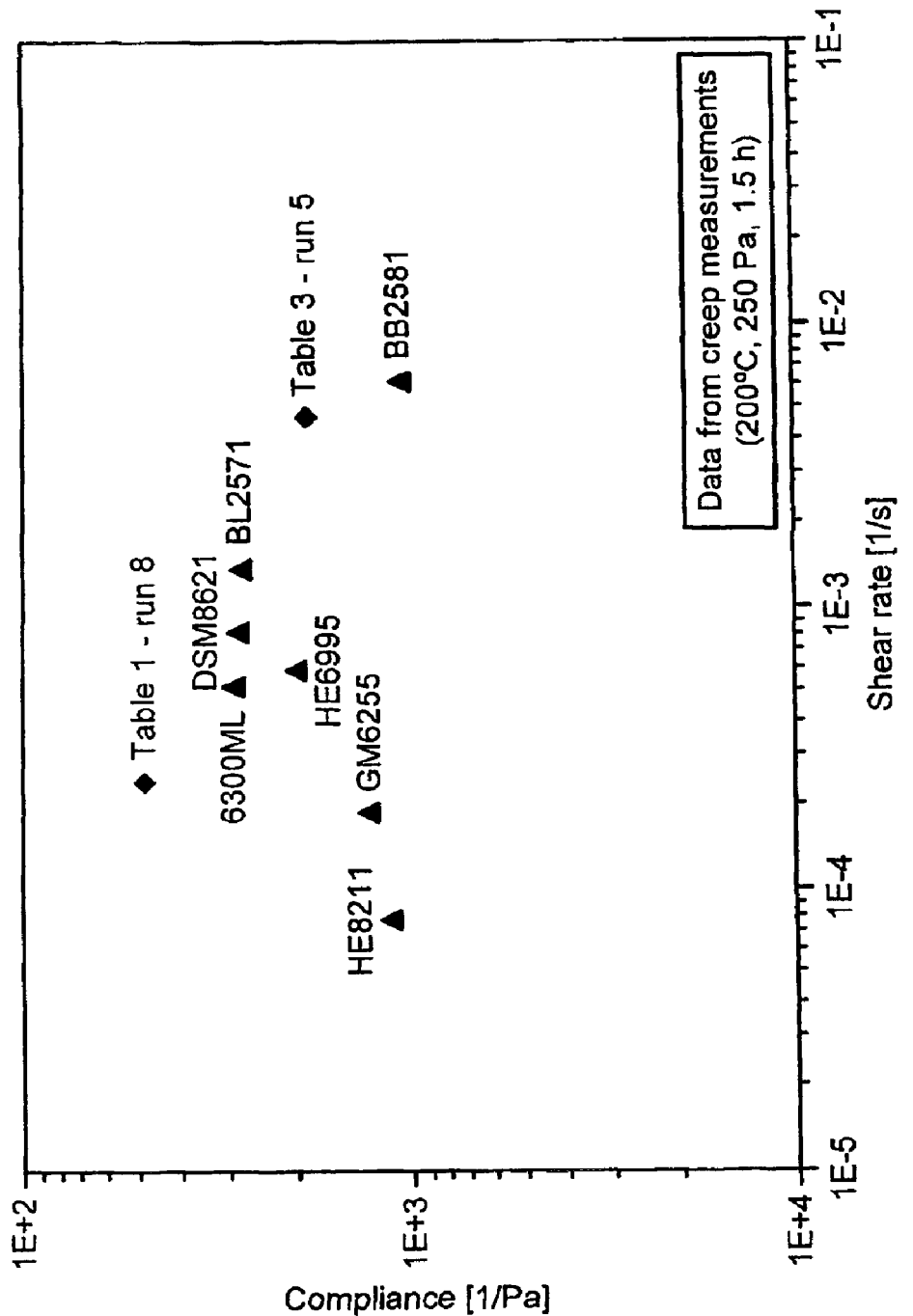
FIG. 5 also relating to shear rate shows the polyethylenes of the invention have higher compliance values than the corresponding commercial polyethylenes.

For the materials tested, the compliance was also determined in the same creep test as above. The steady state compliance is related to the elasticity of the material. A high compliance for a given shear viscosity (cf FIG. 4) indicates a high elongational viscosity and high melt strength, i.e. at the given shear rate. Higher compliance will generally be indicative of improved properties. As can be seen from FIG. 5 of the accompanying drawings, at the higher and lower shear rates, the polyethylenes according to the invention have noticeably higher compliance values than the corresponding commercial polyethylenes.

These results are extraordinary considering that such high compliance values are not accessible using the individual catalysts alone.

What is claimed is:

1. A catalyst system comprising: a transition metal bisphenolate catalyst and another olefin polymerization catalyst, and optionally a co-catalyst.

2. A catalyst system as claimed in claim 1 wherein said transition metal bisphenolate is a bisphenolate complex of a group 4, 5 or 6 transition metal.

3. A catalyst system as claimed in claim 1 wherein said transition metal bisphenolate is a bisphenolate complex of titanium.

4. A catalyst system as claimed in claim 1 wherein said transition metal bisphenolate catalyst is a complex of a transition metal with a ligand the precursor of which is of formula II:

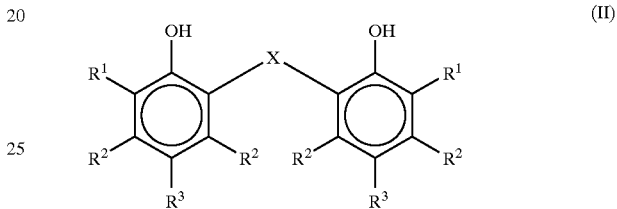

where X is a bond or a one or two atom bridge;
each $R^1$, which may be the same or different, is a group containing at least 3 non-hydrogen atoms;
each $R^2$, which may be the same or different, is a hydrogen atom or a group containing at least 1 non-hydrogen atom; and
each $R^3$, which may be the same or different, is a group containing at least 1 non-hydrogen atom, or
two or more groups $R^1$, $R^2$ and $R^3$ may together form a bridging group.

5. A catalyst system as claimed in claim 4 wherein in the ligand precursor of formula II X is sulphur and each $R^2$ is hydrogen.

6. A catalyst system as claimed in claim 1 wherein said another olefin polymerization catalyst is a metallocene.

7. A catalyst system as claimed in claim 1 wherein said another olefin polymerization catalyst is a Ziegler Natta catalyst or an organochromium catalyst.

8. A catalyst system as claimed in claim 1 comprising a particulate support material carrying said transition metal bisphenolate catalyst and said another olefin polymerization catalyst and optionally a said co-catalyst.

9. A catalyst system according to claim 1 which is heterogeneous.

10. A catalyst system as claimed in claim 9 comprising a particulate support material carrying said transition metal bisphenolate catalyst and optionally a said co-catalyst.

11. A catalyst system as claimed in claim 8 wherein said support material is silica.

12. A method of producing a polyolefin, characterised in that an alpha olefin is polymerized in the presence of a catalyst system according to claim 1.

13. A polyolefin article or composition containing detectable traces of a catalyst system according to claim 1.

* * * * *